United States Patent [19]

Taylor et al.

[11] 4,240,104
[45] Dec. 16, 1980

[54] MEASUREMENT OF CHROMA KEY AREA IN TELEVISION SYSTEMS

[75] Inventors: Richard J. Taylor, London; Paul R. N. Kellar, Newbury, both of England

[73] Assignee: Quantel Limited, Berkshire, England

[21] Appl. No.: 5,533

[22] Filed: Jan. 22, 1979

[30] Foreign Application Priority Data

Jan. 30, 1978 [GB] United Kingdom ............ 3702/78

[51] Int. Cl.³ .................................. H04N 9/535
[52] U.S. Cl. ........................................... 358/22
[58] Field of Search ................. 358/22, 180, 183, 107

[56] References Cited

U.S. PATENT DOCUMENTS

| | | | |
|---|---|---|---|
| 3,740,468 | 6/1973 | Gardner et al. | 358/107 |
| 4,163,992 | 8/1979 | Inaba et al. | 358/22 |
| 4,178,613 | 12/1979 | Takahashi et al. | 358/22 |

Primary Examiner—John C. Martin
Attorney, Agent, or Firm—Dowell & Dowell

[57] ABSTRACT

A chroma key measuring system for determining the area of chroma key within a television picture. The position of each side of the key area is measured line by line to determine a maximum and minimum value, and top and bottom of the area is determined from the upper and lower cross over positions of the sides to provide an output indicative of the size and position of the key area. This output can be used as a control signal for further equipment generating a further picture which is to be inserted in the key area so that the size and position of the inserted picture is adjusted to correspond to the calculated parameters.

17 Claims, 14 Drawing Figures

MEASUREMENT OF CHROMA KEY AREA IN TELEVISION SYSTEMS

BACKGROUND OF THE INVENTION

The invention relates to television systems and more particularly to the measurement of chroma key area in such systems.

In television newscasting, for example, it is known (see FIG. 1) to transmit a television picture 10 which includes an announcer 11 and a rectangular screen 12 onto which a scene 13 relevant to that part of the programme is superimposed.

The scene is not actually projected onto screen 12 but is electronically inserted by the system shown in FIG. 2 prior to transmisson. A first camera 20 receives the image of the announcer 11 and the blank screen 12. A second camera 21 receives the image of scene 13. The outputs from cameras 20,21 are received by an electronic switching unit 23 which is under the control of chroma key generator 24. Generator 24 also receives the output from camera 20. The screen 12 is normally a uniform blue colour and this is termed the chroma key (also known as CSO Chroma Separation Overlay). Selection of this blue colour allows the generator 24 to distinguish over other parts of the picture. The output from camera 20 normally passes to the output when switch 23 is in the position shown. When chroma key is present however switch 23 is changed under the control of generator 24 to the other position so that a portion of scene 13 is inserted during the presence of chroma key. Thus line by line the scene 13 is inserted into that portion of the picture containing chroma key. As shown part of the screen 12 is obscured by the announcer. This will prevent the chroma key for that part of the screen being detected so that the corresponding portion of the scene 13 will not be inserted thus generally avoiding partially obscuring the announcer.

Whilst the above known system is generally satisfactory, when the screen is not rectangular, for example due to partial obscuring by the announcer, the known detector system has difficulty in clearly determining the edge of the screen and thereby gives rise to the ragged or fuzzy edges commonly seen around the announcer's head. Thus such a detector system is unsuitable for use in accurately computing the key area size and position on its own. Another problem is that the system of FIG. 2 requires that cameras 20, 21 be in fixed positions because it can be seen that if camera 20 were zoomed in then screen 12 would be too large for scene 13 which would only partially fill the screen. Alternatively, if camera 20 were zoomed out then part of scene 13 would be lost. Sideways movement of camera 20 would give similar problems.

Co-pending patent application 42751/76 (U.S. patent application Ser. No. 841,519, now U.S. Pat. No. 4,163,249) describes a system (Quantel DPE 5000) able to modify the size and position of a T.V. picture. Therefore, if this system were to be given a measure of the size and position of screen 12, the DPE 5000 would be able to modify the size and position of the picture of scene 13 from camera 21 so that when keyed into the picture from camera 20, scene 13 fits the area of screen 12 exactly.

OBJECT OF THE INVENTION

An object of the invention is therefore to measure the size and position of the incoming chroma key from camera 20 irrespective of the size, shape or degradation of the key area. The parameters of size and position produced by the system of the present invention are then available for use by further apparatus for example in the DPE 5000 to instruct it to modify the picture from camera 21 accordingly.

SUMMARY OF THE INVENTION

According to the invention there is provided a chroma key area measurement system comprising means for measuring the position of each side of the key area within the television picture and means for measuring the position of the top and bottom of the key area within the television picture to determine the size and position of the incoming chroma key area irrespective of its shape or degradation whereby the system output is indicative of the key area size and position.

Output means may be provided for controlling the size and position of a scene to be inserted within the chroma key area in dependence on the measured key area.

Further according to the invention there is provided a method of measuring the area of chroma key within a television picture comprising measuring the position of each side of the key area within the television picture and measuring the position of the top and bottom of the key area within the television picture to determine the size and position of the incoming key area irrespective of its shape or degradation.

BRIEF DESCRIPTION OF DRAWINGS

The invention will now be described by way of example with reference to the accompanying drawings in which:

FIG. 5 shows an accumulator arrangement for determining the position over the whole area in response to data from the FIG. 4 arrangement.

DESCRIPTION OF PREFERRED EMBODIMENT

Figure 2:
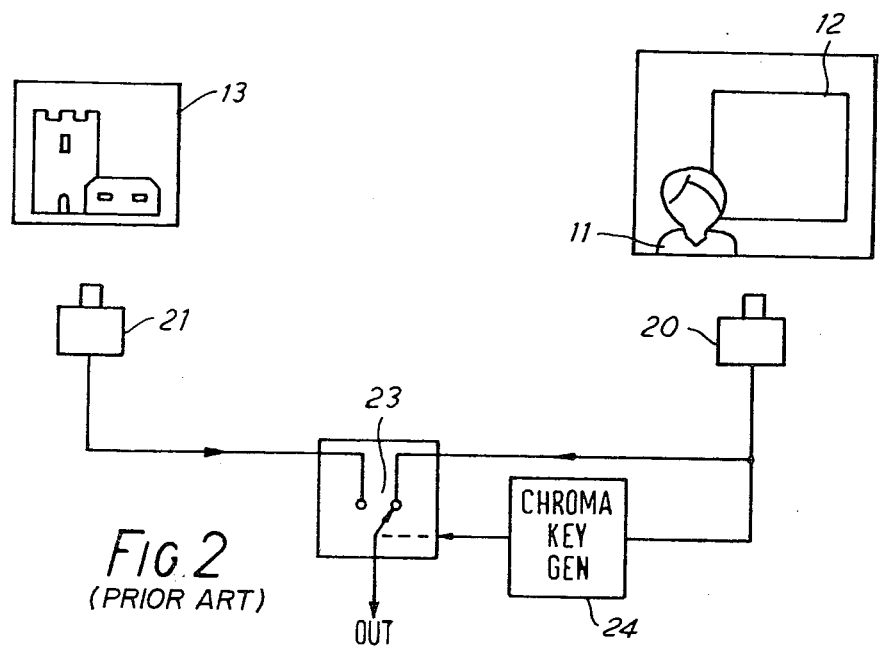
FIG. 2 shows the known arrangement for producing this picture configuration.
Figure 3:
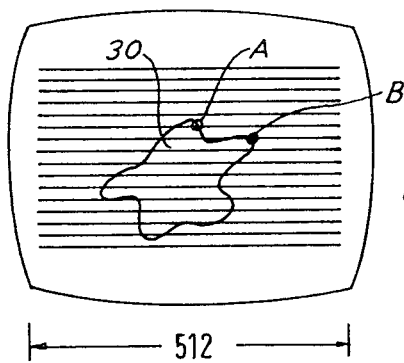
Figure 4:
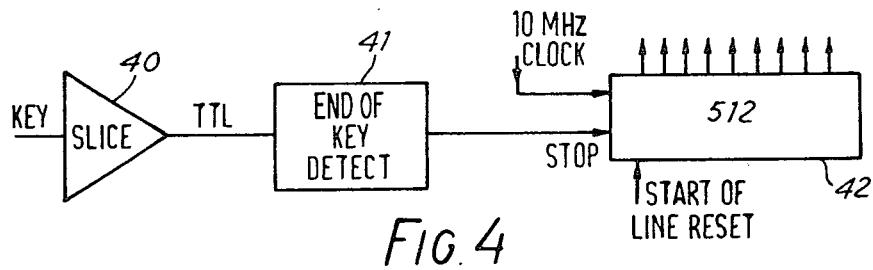
FIG. 4 shows an arrangement for determining the end of key area position on one line in the present invention.

FIG. 3 shows an irregular shaped key area 30 within the picture which is to be analysed. An arrangement for determining the location of the right hand side of the key area of FIG. 3 is shown in FIG. 4. The key signal from the key generator of FIG. 2 is passed to a slicer 40 which produces a TTL compatible signal which is received by a detector 41 which detects when the key is no longer present on the incoming signal. The detector 41 output is connected to a counter 42. Each line of the picture is broken up into 512 points and consequently the counter has a capacity of 512. The output of counter 42 is available as a 9 bit word. At the start of each line the counter is reset and the 10 MHz clocks are counted until the end of the key is detected by detector 41 which stops the counter. The counter output is indicative of the end (right hand) position of the key for that line. At the start of the next line the counter is reset and the end position of the key for the next line is determined. Thus point A of FIG. 3 is one right hand end position for the key for the irregular shaped area and point B another end position for the key area.

Figure 5:
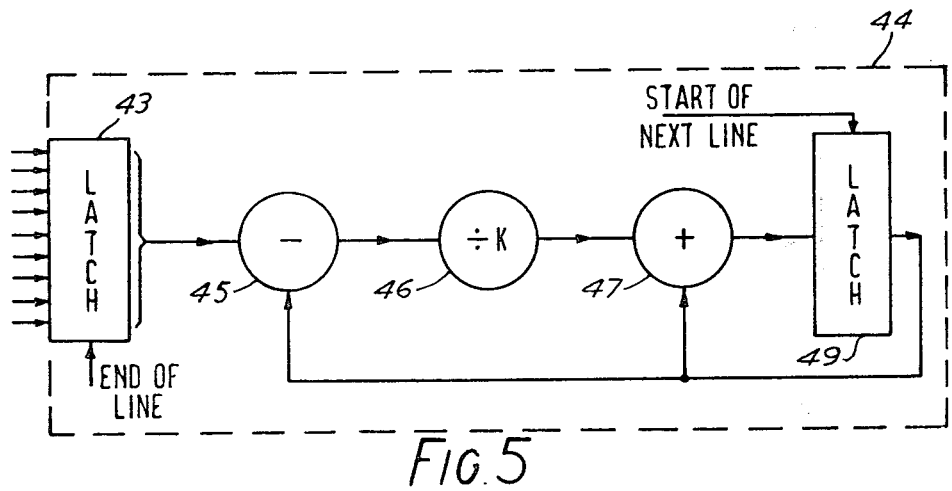
FIG. 5 shows an irregular shaped key area within the television picture.

To determine the maximum right hand position of the key area over the entire picture the output of counter 42 is connected to the accumulator circuit of FIG. 5. At the end of the line (during line blanking) the contents of counter 42 is latched into a latch 43 before the counter is reset to zero at the start of the next line. The 9 bit output of latch 43 is received by a subtractor 45. The subtractor and the other parts of the circuit also have 9 bit inputs and outputs but for the sake of clarity these are simply shown as single wires. The subtractor output is received by a divider 46 which divides by a coefficient K. It will be assumed that K=2 but other values could be used. The output of divider 46 is connected to adder 47 which has its output connected to latch 49. The output of latch 49 is received by the subtractor 45 and the adder 47. The latch 49 operates at the start of the next line. The determination of the start and end of a line is provided by standard video techniques. The accumulator circuit of FIG. 5 operates by subtracting the latch 49 output from latch 43 output so that subtractor 45 produces the difference between these outputs. The divider reduces this output to half the difference and this is then added to latch 49 output so that on actuating latch 49 at the start of the next line the latch will now contain the earlier accumulated count plus half the difference between the latches. The subtractor is not allowed to operate to produce a negative number output so it will merely produce a zero output number if the latch 43 output derived from counter 42 is less than the count held be latch 49. It is therefore seen that this arrangement provides 'peak' detection of the right hand position of the key area. By providing the arrangement of adding half the difference to the output of latch 49 a 'smoothing' effect is produced in the edge calculation. Thus the circuit acts as a 'smoothing' peak detector controlled by selecting coefficient K which may be other than K=2 (e.g. K=5). The output of latch 49 can be read out at the bottom of each field and will give the measured peak right hand position of the key area.

Figure 6:
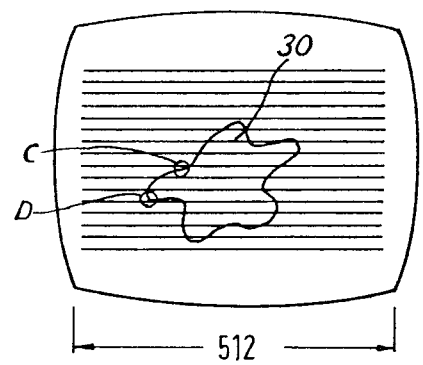
FIG. 6 shows the key area of FIG. 3 with relation to the start of the area.
Figure 7:
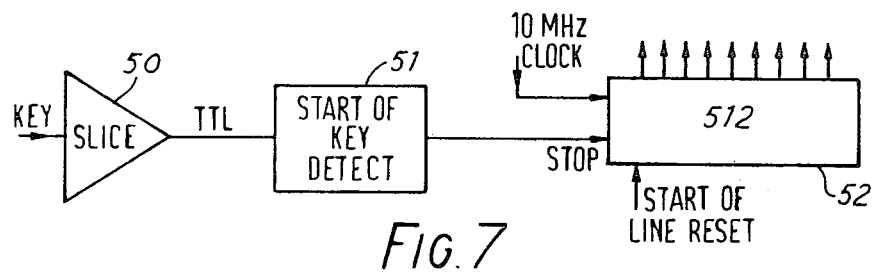
FIG. 7 shows an arrangement for determining the position of the start of the key area on one line.
Figure 8:
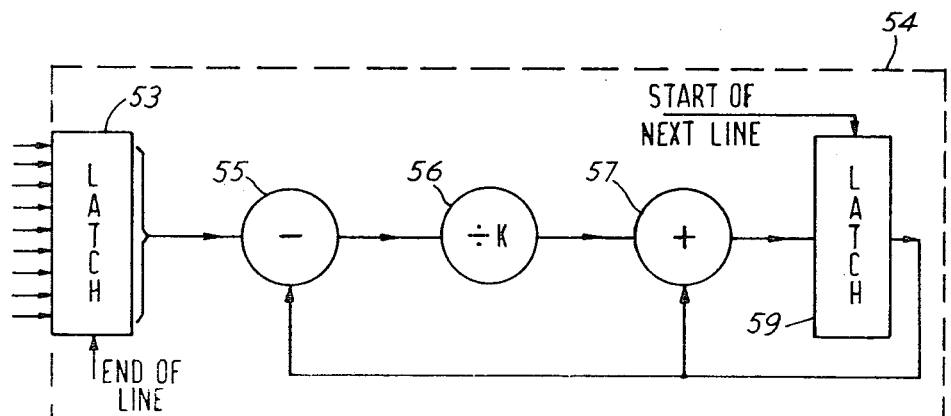
FIG. 8 shows an accumulator for receiving the output of the FIG. 7 arrangement to determine the start of the key over the whole area.

To calculate the minimum (left hand) position of the key area 30 of FIG. 6 the circuit blocks of FIGS. 7 and 8 are provided which have similarities to FIGS. 4 and 5.

The slicer 50 is however connected to a start of key detector 51 which stops the counter 52 when the start of the key is detected. Thus point C of FIG. 6 is one left hand end position for the key of the irregular shaped area and point D is another end position on another line. The counter output is latched by latch 53 and subtractor 55 receives the latch output. The subtractor 55 output is connected to divider 56 ($\div 2$) and passes to a subtractor 57 (instead of the adder of FIG. 5). The subtractor output is received by latch 59 when actuated. The subtractor 55 is only allowed to produce a negative output number and produces a zero if the difference becomes positive. It is seen that half the difference of the latches 53, 59 is subtracted from the previous count of latch 59. Thus the 'smoothed' left hand side minimum is computed and its position can be read out at the bottom of the field.

Figure 9:
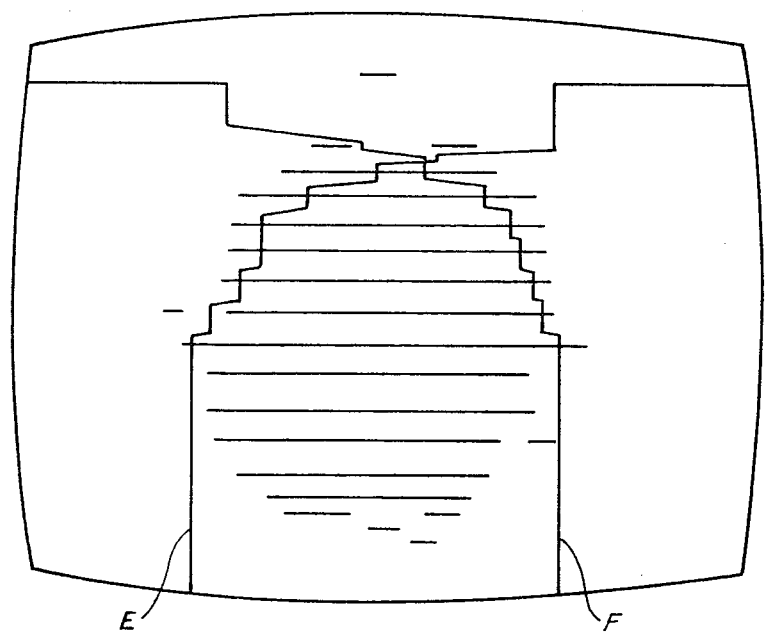
FIG. 9 shows the output of the FIGS. 5 and 8 arrangements in relation to the key area.

FIG. 9 shows the accumulator operation on the key area. Waveform E represents the latch output for the accumulator calculating the minimum left hand side position of the key area and waveform F represents the latch output of the accumulator calculating the right hand maximum position of the key area. It is seen from FIG. 9 that even with a degraded key area as shown which was broken up in parts the accumulator circuits still adequately handle such a signal.

To calculate the top and bottom of the key area additional accumulator circuits are provided.

Figure 10:
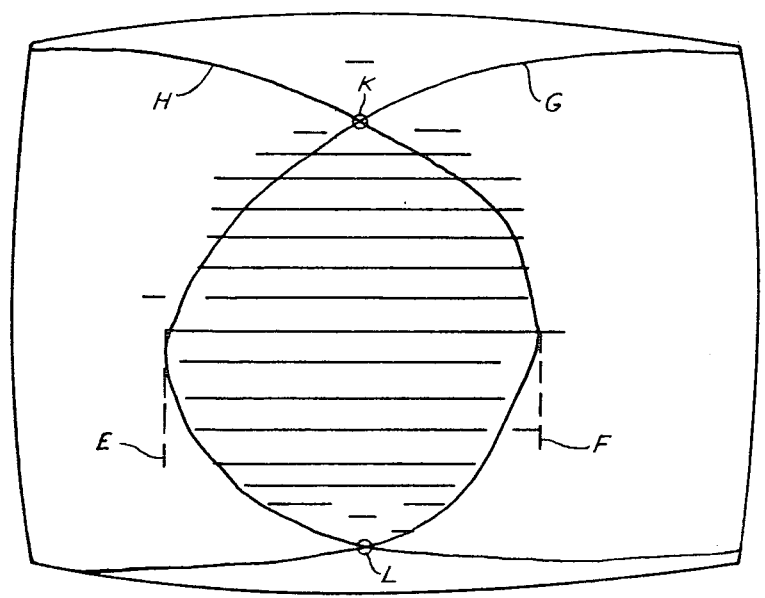
FIG. 10 shows the output of accumulator circuits similar to the FIGS. 5 and 8 arrangements for subsequent determination of the top and bottom position of the key area.

Referring now to FIG. 10 the mean of waveforms E and F are shown as terminating in broken lines. To determine top and bottom of the key areas an arrangement similar to FIG. 5 is provided but the subtractor is allowed to go negative. Such an arrangement produces the output shown as waveform H which partly corresponds to waveform F but tracks back in the negative direction. A further accumulator arrangement similar to FIG. 8 is used to produce the waveform G. The first subtractor of this arrangement is allowed to go positive so that the output does not hold at the minimum as in waveform E but extends in a positive direction as shown. It is seen that at points K and L cross over of waveforms G and H occur. These cross over points give a good indication of top and bottom respectively of the key area.

Figure 11:
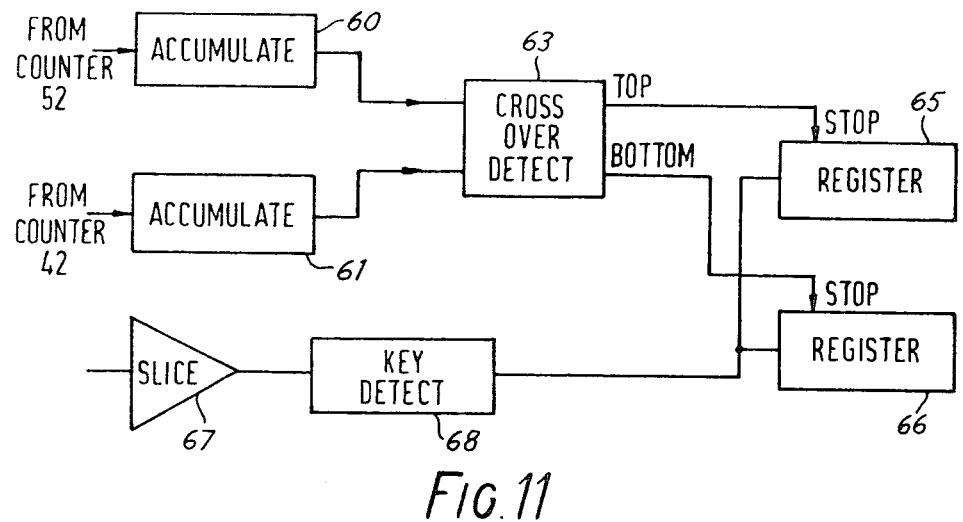
FIG. 11 shows an arrangement for handling the accumulator outputs of FIG. 10 to detect the upper and lower crossover points.
Figure 12:
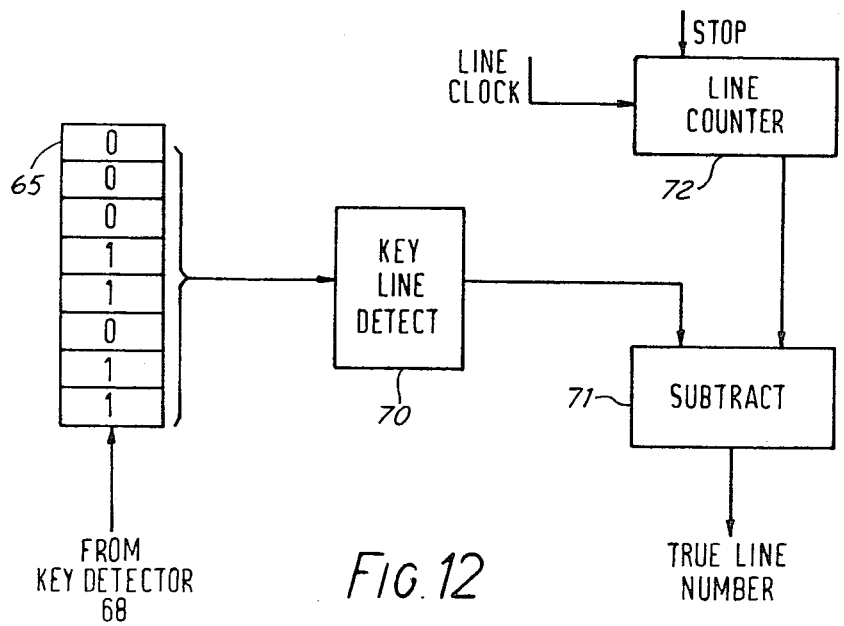
FIG. 12 shows an arrangement for ensuring accurate determination of the upper and lower crossover point positions.

To provide adequate protection against stray key portions and false alarms due to any break up of the key area because of degradation of the picture additional circuit elements are included as shown in FIG. 11. The accumulators just mentioned are designated 60,61. The accumulator outputs are received by the cross over detector 63 which has a first output connected to a first shift register 65 and a second output connected to a second shift register 66. The incoming key is detected by detector 68 via slicer 67. The detector produces a high level (1) when any key is detected on that line and a low (0) when no key is detected on that line. Thus the key detector output is received by the shift registers which are updated line by line until a cross over is detected. The top cross over K will stop shift register 65 and the register 66 will continue to be updated at the end of each line until the bottom cross over is detected. At the end of a field the key position is determined by the highest '1' in the register. The actual line number is determined by subtracting the line number on which the register stopped and the highest position of a '1' detected in the register. This can be effected by the arrangement of FIG. 12 which shows only the calculation for the top of the key area. A similar arrangement will be provided for the other register. At the end of a field the key line detector 70 detects the position of the highest binary 1 in the 8 bit shift register 65. In the example shown it is seen to be five lines in. The output from detector 70 is received by subtractor 71. The other input to subtractor 71 is received from a line counter 72 which is also stopped by the cross over detector. Thus if the line at which cross over occurred was line 50 then the 'true' top of the key area would be 50−5=45.

It is seen that the circuits described allow the positioning of the top, bottom and sides of the key area to be determined and thus define a rectangle in which the key area is enclosed. The size of this rectangle is also known from the above parameters and provides the best dimensions for an irregularily shaped key area.

Figure 1:
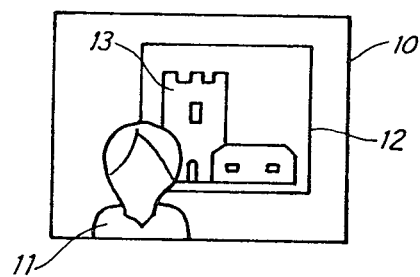
FIG. 1 shows a known television broadcasting configuration.
Figure 13:
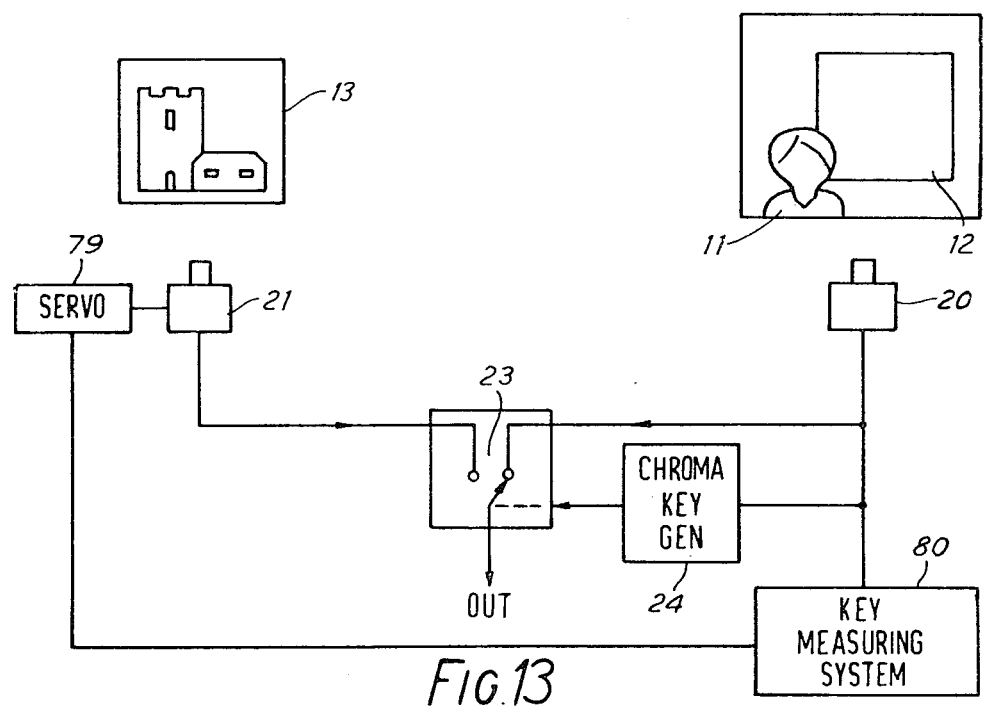
FIG. 13 shows the measurement system of the invention used to provide servo control of the camera.
Figure 14:
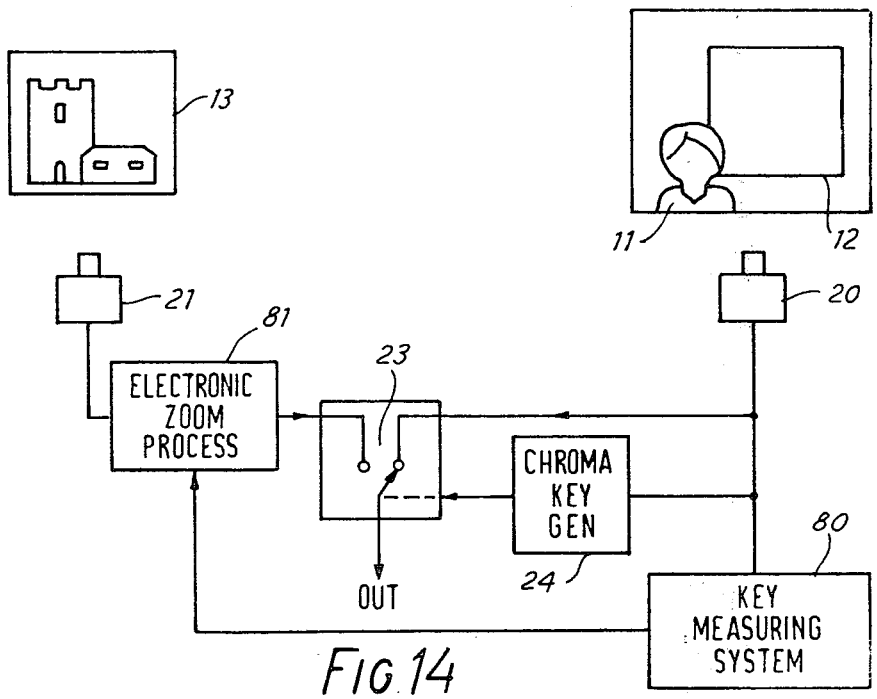
FIG. 14 shows the measurement system used to control the size of the picture electronically.

Returning now to FIG. 1, as the key area and position is calculated continuously frame by frame, if camera 20 is zoomed in and out the key area measurement is continually updated since frame by frame integration is not used. Thus if cameras 20 and 21 were interconnected by position servos 79 as shown in FIG. 13 and using the measurement system of the invention just described and shown schematically as key measuring system 80, it would be possible to control camera 21 to follow the key area size to always produce scene 13 with the desired dimensions to fit the key area. Alternatively the scene 13 could be zoomed electronically be means of the processor disclosed in copending British application 42751/76 (U.S. patent application No. 841,519) in dependence on the dimensions received from the above key area measurement system shown as block 81 in FIG. 14.

Although the system has been described in terms of hardware which can be realised using integrated circuit techniques, it is possible also to produce the system functions by means of software, using microprocessors for example.

We claim:

1. A chroma key area measurement system comprising means for measuring the position of each side of the key area within the television picture including spacial filter means for providing a smoothing facility for removing uncertainty of size or position if the key area is degraded and means responsive to the first mentioned means for measuring the position of the top and bottom of the key area within the television picture to determine the size and position of the incoming chroma key area whereby the system output is indicative of the key area size and position.

2. A system according to claim 1, wherein the means for measuring the position of each side of the area comprise picture point counting means for successively counting the number of picture points occurring prior to the start and up to the end of the chroma key on a line and including accumulation means for receiving the successively counted picture points to determine the minimum and maximum values for the measured positions during one field.

3. A system according to claim 2 wherein the means for measuring the top and bottom of the key area comprise accumulation means for receiving the successively counted picture points indicative of the start and the end of the croma key and detection means for detecting the upper and lower cross over positions of the accumulated picture points to provide an indication of the top and bottom of the key area.

4. A system according to claim 3, wherein corrector means are provided for modifying the calculated cross over position by determining any error therein.

5. A system according to claim 4 wherein the corrector means includes register means for storing line information indicative of the presence of detected chroma key and subtractor means for subtracting the line position of the earliest line number for detected chroma key from the line number corresponding to the cross over point to provide a modified cross over position.

6. A system according to claim 2, wherein the accumulator means for determining the first side of the key area includes said filter means comprising subtractor means for successively subtracting the previous line position from the current line position, divider means for dividing the resultant output by a predetermined value and adder means for adding the divided output to the previous line position count.

7. A system according to claim 2, wherein the accumulator means for determining the second side of the key area includes said filter means comprising subtraction means for successively subtracting the previous line position from the current line position, divider means for dividing the resultant output by a predetermined value and subtractor means for subtracting the previous line position from the divided output.

8. A system according to claim 1, wherein output means are provided for controlling the size and position of a scene to be inserted within the chroma key area in dependence on the measured area.

9. A system according to claim 8, wherein the output means comprises a camera servo system for adjusting the picture size and position provided by a remote camera.

10. A system according to claim 8 wherein the output means comprises an electronic zoom system for providing control of an incoming picture to effect modification in size and position thereof.

11. A method of measuring the area of chroma key within a television picture comprising measuring the position of each side of the key area within the television picture including filtering the position measurement data to provide a facility for removing uncertainty of size or position if the key area is degraded, and from the side position information measuring the position of the top and bottom of the key area within the television picture to determine the size and position of the incoming key area.

12. A method according to claim 11 wherein the measurement of the side positions includes successively measuring the position of each side of the area line by line and accumulating the measured position values to provide a minimum and maximum value defining the side positions.

13. A method according to claim 11 wherein the measurement of the top and bottom positions includes accumulating the measured side position values and detecting upper and lower cross over positions of the picture sides to provide an indication of the top and bottom of the picture.

14. A method according to claim 13 wherein the cross over position is modified by determining any error in the calculated line position.

15. A method according to claim 14, wherein the error is corrected by storing line information indicative of the presence of detected chroma key and subtracting the line position of the earliest line number for detected chroma key from the line number corresponding to the cross over point to provide a modified cross over position.

16. A method according to claim 12, wherein the accumulated value for the first side position is filtered by successively subtracting the previous line position from the current line position, dividing the resultant output by a predetermined value and adding the divided output to the previous line position count.

17. A method according to claim 12, wherein the accumulated value for the second side position is filtered by successively subtracting the previous line position from the current line position, dividing the resultant output by a predetermined value and subtracting the previous line position from the divided output.

* * * * *